(12) United States Patent
Enenkel

(10) Patent No.: US 8,981,674 B2
(45) Date of Patent: Mar. 17, 2015

(54) DETECTOR CIRCUIT AND METHOD FOR OPERATING A DETECTOR CIRCUIT

(75) Inventor: Jan Enenkel, Gratkorn (AT)

(73) Assignee: AMS AG, Unterpremstaetten (AT)

( * ) Notice: Subject to any disclaimer, the term of this patent is extended or adjusted under 35 U.S.C. 154(b) by 146 days.

(21) Appl. No.: 13/575,026

(22) PCT Filed: Jan. 10, 2011

(86) PCT No.: PCT/EP2011/050226
§ 371 (c)(1),
(2), (4) Date: Sep. 13, 2012

(87) PCT Pub. No.: WO2011/092051
PCT Pub. Date: Aug. 4, 2011

(65) Prior Publication Data
US 2012/0326633 A1    Dec. 27, 2012

(30) Foreign Application Priority Data

Jan. 27, 2010    (DE) .......................... 10 2010 005 907

(51) Int. Cl.
*G05F 1/00* (2006.01)
*H05B 33/08* (2006.01)
(Continued)

(52) U.S. Cl.
CPC ........ *H05B 37/0254* (2013.01); *H05B 33/0842* (2013.01); *G06F 13/00* (2013.01)
USPC ............................ 315/307; 315/308; 315/291

(58) Field of Classification Search
USPC ............... 315/88, 89, 90, 291, 294, 295, 297, 315/299, 307, 308, 361
See application file for complete search history.

(56) References Cited

U.S. PATENT DOCUMENTS

2006/0279519 A1    12/2006    Wang
2007/0066877 A1    3/2007     Arnold et al.
2007/0085786 A1    4/2007     Lin et al.
(Continued)

FOREIGN PATENT DOCUMENTS

DE    102007011646 A1    9/2008
DE    102007011648 A1    9/2008

OTHER PUBLICATIONS

Song, et al., "A Digital Brightness Controlled White LED Driver with I²C-bus Interface", ISIC, 2009, pp. 494-497.
(Continued)

*Primary Examiner* — Douglas W Owens
*Assistant Examiner* — Jianzi Chen
(74) *Attorney, Agent, or Firm* — McDermott Will & Emery LLP

(57) ABSTRACT

The invention relates to a detector circuit comprising a connection for a voltage supply (Vbat) and a connection for connecting a lamp (LED), said connection being connected to the connection for a voltage supply (Vbat) and to a first control component (I2C) of a first interface protocol and a second control component (PWM) of a second interface protocol. The detector circuit further comprises a first input node (In1) and a second input node (In2), wherein the first control component (I2C) is connected to the first input node (In1) and the second input node (In2) and the second control component (PWM) is connected to the second input node (In2). A detector (det) for ascertaining an interface standard is coupled to the connection for a voltage supply (Vbat) and the first input node (In1) on one side and to ground (GND) on the other side.

12 Claims, 3 Drawing Sheets

Figure 1:
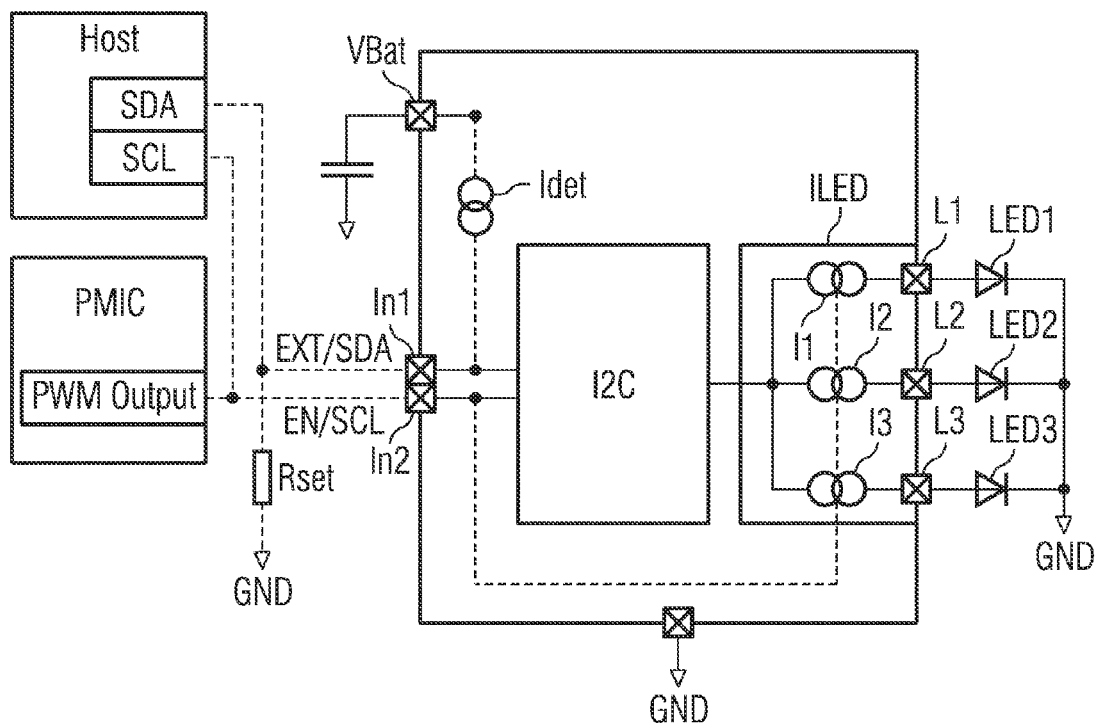

(51) Int. Cl.
*G06F 13/00* (2006.01)
*H05B 37/02* (2006.01)

(56) References Cited

U.S. PATENT DOCUMENTS

2007/0268236 A1 11/2007 Morrow
2008/0100224 A1 5/2008 Felder et al.
2008/0136334 A1 6/2008 Robinson et al.

OTHER PUBLICATIONS

"AS3687/AS3687XM—Flexible Lighting Management (Charge Pump, DCDC, Seven Current Sinks, ADC, LED Test, Audio Light Control", AustriaMicroSystems AG—Product Brief, Revision 1.2, Dec. 19, 2007, pp. 1-4-4-4.
Austriamicrosytems AG, Data Sheet "AS1101, AS1102, AS1103, AS1104 Low-Dropout LED Drivers,"Rev. 1.5 2007, pp. 1-13.

DETECTOR CIRCUIT AND METHOD FOR OPERATING A DETECTOR CIRCUIT

The present invention relates to a detector circuit and a method for operating a detector circuit.

Light emitting diodes (LEDs for short) have diverse applications in mobile devices such as cell phones and personal digital assistants (PDAs). Their advantageous properties, such as compactness, light intensity, low power consumption and their availability in a wide range of different colors make them particularly suitable for use in compact devices. For example, LEDs are used as flash lamps in digital cameras and camera cell phones or as backlighting for display screens in mobile telephones, small monitors or measuring devices. Drivers, which are generally configurable and drive the LEDs that are used, are selected based on the application. The degree of configurability depends on the price requirements of the manufacturer and comprises interface standards of differing expense, depending on the specification.

In the course of mobile telephone development, both $I^2C$ ($I^2C$: Inter-Integrated Circuit) and PWM topologies (PWM: pulse width modulation) have been used. The $I^2C$ standard is often used in telephones if no GPOs (General Purpose Outputs) or PWM generators are available. An implementation is often chosen for driver circuits in which a current can be adjusted via internal current sources using a DAC (digital-to-analog converter) and the brightness of the LEDs in use is then varied by means of PWM topologies. Because of the internal power sources, this process is asynchronous, i.e. independent on external systems. If a developer would like to operate a driver circuit synchronously with external systems, he chooses a PWM topology. An external system in this case is a PWM Generator, which can alternatively comprise a PMIC (Power Management IC), a baseband, host processor, microcontroller or a simple PWM generator component.

In general, a designer must decide quite early during the development, however, on the components, and therefore the interfaces, which will be used in a given device. This has the effect that different product series rapidly diverge in design and have different starting bases. A shared compatible base that requires less modification effort generally does not exist.

The objective of the present invention is to create a detector circuit and a method for operating a detector circuit that allow a higher compatibility for a designer.

This objective is solved with the subject matter of the independent claims. Configurations and refinements of the invention are the subject matter of the dependent claims.

In one embodiment, a detector circuit comprises a terminal for a voltage supply, as well as a terminal for connecting a light source that is connected to the terminal for a voltage supply. The detector circuit further comprises a first control module of a first interface protocol and a second control module of a second interface protocol, which are in turn connected to the terminal for connecting a light source. The detector circuit further comprises a first input node and a second input node. The first control module is connected to the first input node and the second input node, and the second control module is connected to the second input node. A detector for defining an interface standard is connected on the one hand to the terminal for a voltage supply and the first input node, and to ground on the other hand.

Hereinafter the term interface protocol refers to an agreement according to which a connection, communication or data transfer between two electronic components operates.

Characteristic signals are present at the first input node and/or the second input node, depending on the interface protocols in use. The signals are each characteristic of the interface protocol in use and can therefore be fundamentally differentiated. For example, signals can be present both at the first and the second input nodes for a first interface protocol, while for a second interface protocol, the characteristic signal is only present at the second input node. With the aid of the detector, it is then possible to measure signals at the first and second input nodes and thus determine the interface protocol that will be applied in the respective case. It is then possible to activate the corresponding first or second control module on the detector circuit for further signal processing.

It is advantageously possible to employ one detector circuit for using different interface standards. This makes it possible to use the same detector circuit on a shared basis in different product lines. A specific use is then determined externally, for example, by specifying certain signal characteristics or an interface protocol at the input nodes. Thus the developer can flexibly decide the interface protocol with which he wishes to operate the circuit. With the control modules, the detector circuit has appropriate means that are designed for operation according to the respective interface protocol and can be configured via the input nodes.

For this purpose, an interface protocol according to the $I^2C$ standard and a PWM interface protocol (PWM: pulse width modulation) are advantageously used. For example, a host processor can be used for the implementation of the $I^2C$ standard, or a power management IC (PMIC) or any other PWM generating module can be used for the PWM protocol. In this way, it is possible, depending on the application, to configure and operate corresponding loads, preferably a light source such as an LED for backlighting a display. A PMIC module encodes configuration files using a pulse width modulation. An implementation according to the $I^2C$ standard enables a simple, space-saving and favorable implementation according to a widespread standard.

In another embodiment, the detector circuit comprises a detector with a current source. The current source in this case is connected to the terminal for a voltage supply and to the first input node.

With the aid of the current source, a voltage at the first input node can be used as a characteristic signal for defining the interface protocol.

In one embodiment, the detector circuit comprises a comparator.

With the aid of the comparator, it is possible to compare the signal at the first input node, preferably a voltage, to a reference signal or a reference voltage. A detector can be realized in this manner with simple switching means, which can also be integrated.

In another embodiment, the detector comprises a logic gate.

In another embodiment of the detector circuit, the first control module is designed for operating a light source according to the $I^2C$ standard, and the second control module is designed for operating a light source according to a PWM interface protocol.

The $I^2C$ standard and the PWM interface protocol are common and simple implementations that are used in many switching components. If appropriate and characteristic signals for the different interface protocols are present at the first and second input nodes, they can be distinguished by the detector and transmitted to the corresponding control modules. The control modules decode the information received by the interface and operate a connected light source such as an LED.

In another embodiment, an external resistor is connected to the first input node.

If the current source is connected to a voltage via the terminal for a voltage source, then a constant voltage drops across the resistor connected to the first input node. This can be used as a characteristic signal for determining the interface protocol. If the PWM standard is used, for example, it is merely necessary to communicate via a connection, preferably the second input node in this case. At the same time, however, there is a constant voltage at the first input node, so it is possible to distinguish between the two interface protocols by using a detector such as a comparator. By specifying a suitably dimensioned resistor, the voltage at the first input node can be selected in such a manner that a confusion of the signal with a data signal according to one of the interface protocols can be ruled out.

In another embodiment, the detector circuit comprises at least one load current source for driving a light source. The load current source is connected at the first control module or the second control module.

In another embodiment, the circuit for driving a light source comprises a charge pump that is connected to the terminal for a voltage supply and to the load current source.

With the aid of the charge pump, a connected light source can be advantageously driven and operated over large ranges with a constant current, independently of fluctuations of the supply voltage such as a battery voltage.

In another embodiment, the detector circuit is implemented as an integrated circuit.

In one embodiment of the method for operating a detector circuit, a signal is detected at a first input node of the detector circuit. The detector circuit is then shifted into a first operating state corresponding to a first interface protocol or into a second operating state corresponding to a second interface protocol. The shifting is based on the detected signal. The method further comprises a step for driving a light source according to the first interface protocol or according to a second interface protocol.

The method for operating a detector circuit advantageously allows the circuit to detect the interface protocol. Thus it is possible to operate a detector circuit and equip it with hardware components in such a manner that a designer can use the same circuit in different product lines as a common basis. A given use is determined by external components and/or by specifying defined signal characteristics of an interface protocol. According to the respective interface protocol, appropriate means of the detector circuit for operating a light source flexibly and within the framework for the production costs can be implemented and suitably configured.

In another embodiment, the method for operating a detector circuit comprises the detection of the signal at the first input node by providing a current at the first input node and measuring a voltage across a resistor.

The use of a defined interface protocol in turn determines the signal characteristics that are detected in the course of the method and define the different operating modes. According to the common interface protocols, such signals are generally voltages that are modulated according to defined specifications or exhibit characteristic curves over time. A voltage with a defined value or a provision of a current, preferably a constant current, represents a suitable means for determining an interface protocol. Thus the voltage or the current can be selected in such a manner that it does not constitute a data signal according to a protocol and represents an indication that a given protocol is not being used.

In another embodiment of the method for operating a detector circuit, the first operating state for operating a light source is designed according to the I$^2$C standard, and the second operating state for operating a light source is defined according to a PWM interface protocol.

The invention will be described in detail below with embodiment examples with reference to the figures. Elements with identical function or effect bear identical reference numbers. In the figures below, alternative components or optional connections are drawn with dashed lines.

Figure 2A:
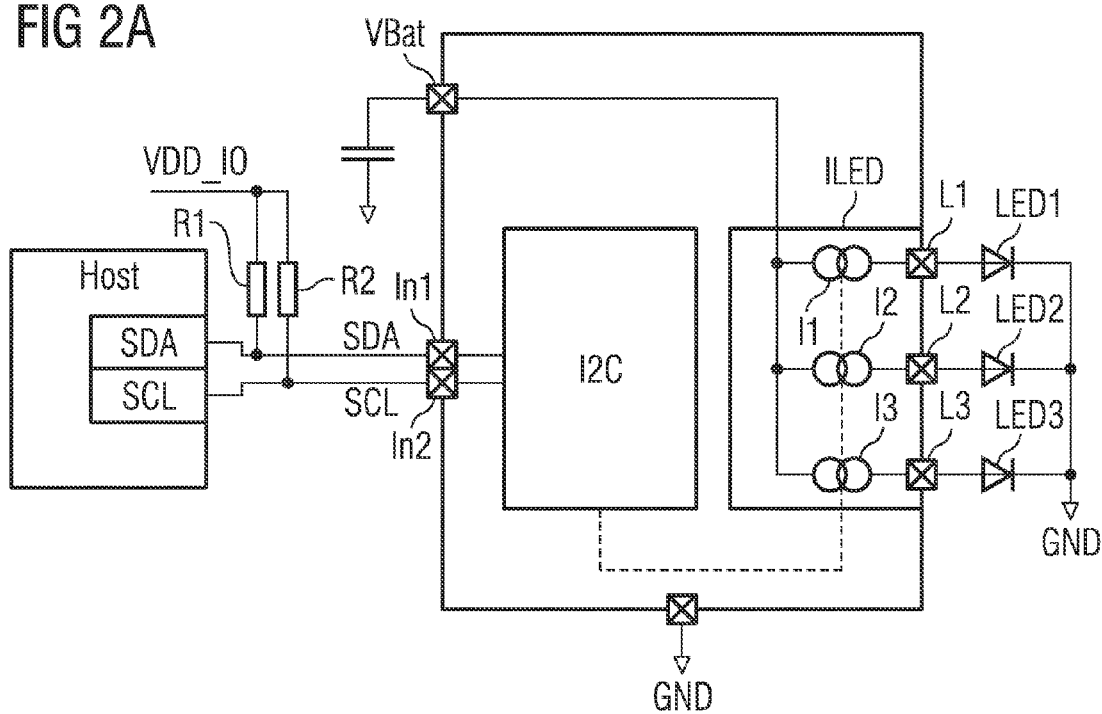
Figure 2B:
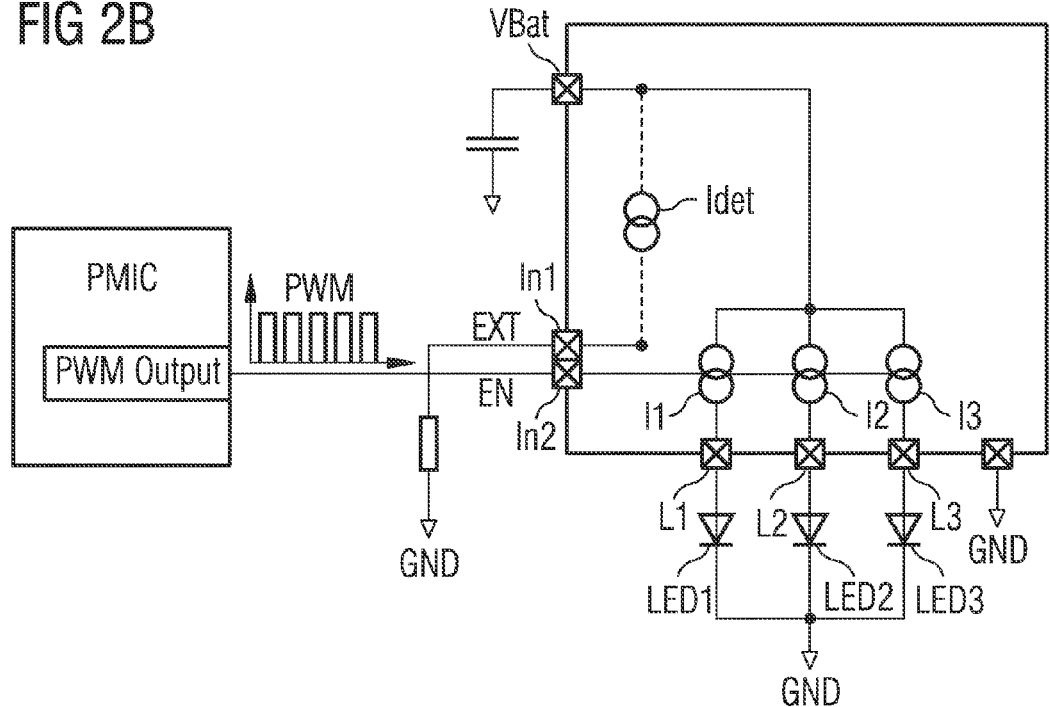
Figure 3:
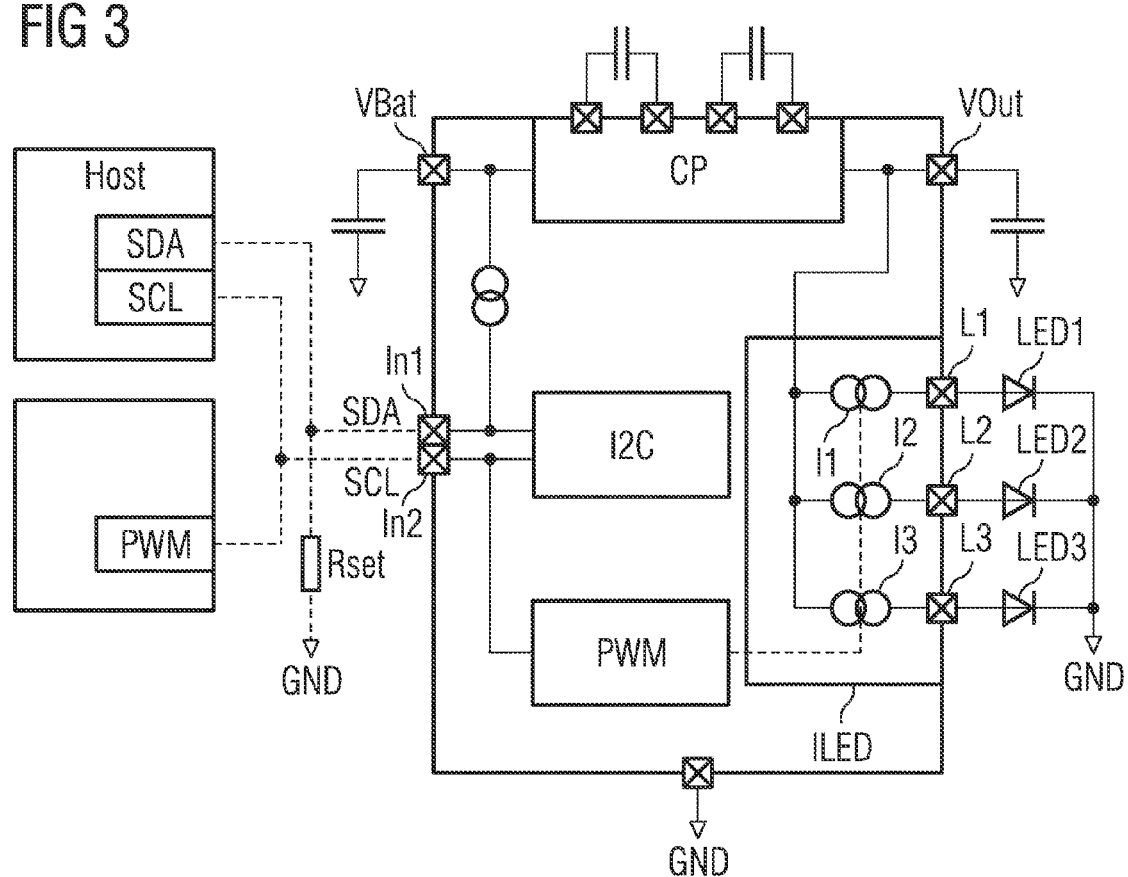

Therein:

FIG. 1 shows an embodiment example of a detector circuit according to the proposed principle, FIG. 2A shows an embodiment example of the detector circuit for use according to the I$^2$C standard, FIG. 2B shows an embodiment example of the detector circuit for operating according to a PWM interface protocol, and FIG. 3 shows an embodiment of the detector circuit as an integrated circuit.

FIG. 1 shows an embodiment example of a detector circuit according to the proposed principle. The detector circuit comprises a first control module I2C, as well as a load current source ILED. The first control module I2C is connected to a first input node In1 and a second input node In2, and is connected via a current source Idet to the terminal for a supply voltage Vbat. The first control module I2C is further connected via three current sources I1, I2, I3 of the load current source ILED to the respective load connection nodes L1, L2, L3. A respective light-emitting diode LED1, LED2 and LED3 is connected to the load output nodes L1, L2, L3 and is coupled to ground GND. The detector circuit further comprises a terminal for ground GND.

In the operation of the detector circuit, input signals are present at the first and second input nodes In1, In2. The latter can be generated, for example, by a first generator Host that is operated according to the I$^2$C standard. Thus data signals SDA are present at the first input node In1, and cycle or clock signals SCL are present at the second input node In2. These signals are detected by a detector and routed to the first control module I2C. The detection is done, for example, by using a comparator and a first voltage measurement at the first input node. Such a comparator is advantageously already integrated into the control module according to the I$^2$C standard and can be used accordingly. The comparator compares whether the current provided by the current source Idet drives the externally connected resistor Rset, which is used to adjust the current for the operation of the circuit according to the PWM interface standard.

Alternatively, signals according to a PWM interface standard can be present at the first and second input nodes. A PMIC (Power Management Integrated Circuit), for example, is used for this purpose. Pulse width-modulated data signals EN are then present at the second input node. The first input node In1 is kept at a constant signal level or a constant voltage EXT via an externally connected resistor Rset. This is preferably done with the aid of a current source Idet that is connected to a terminal for a supply voltage and has the effect that the constant voltage Ext drops across the externally connected resistor Rset. If this constant voltage Ext is measured via the detector, then the first control module I2C is inactive, because in order for it to operate, signals according to the I$^2$C standard should be present at both the first and the second input nodes In1, In2. The corresponding PWM-modulated input signals EN, however, can be routed directly to the load current source LED or to a second control module PWM (not shown).

In other words, the detector circuit is operated either in an I$^2$C mode or a PWM mode. If the I$^2$C mode is active, the circuit cannot be operated in PWM mode, and vice versa. In PWM mode, the first input node In1 is used as an external pin for adjusting the load current source LED. The first input node In1 is used, for example, to turn the load current source for operating LEDs on and off. PWM-modulated signals from a suitable PWM generator that are present at the pin PWM are preferably used for this purpose.

In I$^2$C mode, on the other hand, the current from the load current source is not adjusted via the first input node In1 or an externally connected resistor Rset. The adjustment is done using signals in compliance with the I$^2$C standard at the first and second input terminals In1, In2. A DAC (digital/analog converter) is preferably used for signal processing.

The detector circuit thus recognizes whether it is in I$^2$C or in PWM mode. This takes place when the circuit is started up, for example, when a battery is inserted for supplying voltage. If the externally connected resistor Rset is connected, the current will flow through the load current source LED and through the resistor Rset. A certain voltage arises across the resistor Rset and is queried by the comparator. If this voltage does not arise, i.e. the current from the load current source cannot flow through the resistor because no resistor Rset is connected, the detector circuit is in I$^2$C mode.

It is advantageously possible to employ the detector circuit for using different interface standards. The same detector circuit can therefore be used in different product lines as a common basis. A given use is determined externally by specifying the external voltage Ext or the interface protocol at the first input node In1. With the first and optionally second control modules I2C, PWM, the detector circuit has appropriate means, which are designed for operation according to the respective interface protocol and can be configured via the input nodes In1, In2. It is additionally advantageous that the current is adjusted in PWM mode by the load current source LED via the external resistor Rset and is simultaneously used to recognize whether the detector circuit is being operated in I$^2$C mode or in PWM mode.

With the I$^2$C standard and the PWM interface protocol (PWM: pulse width modulation), interfaces with different production costs can be used on only one circuit. In this manner, it is possible to configure and operate light sources such as LEDs for backlighting a display, for example. A designer is therefore provided with additional freedom for realizing product lines with different cost requirements flexibly and on one common basis.

FIG. 2A shows the detector circuit according to FIG. 1 for use according to the I$^2$C standard. With the aid of a connected generator Host, data signals SDA or clock signals SCL are present at the first input node and the second input node. They are generated according to the I$^2$C standard using a voltage source Vdd and resistors R1 and R2. The first control module I2C is configured with the assistance of the data coded by the I$^2$C standard by tapping the data signals SDA and the clock signal SCL at the first and second input nodes In1, In2. The connected light emitting diodes LED1, LED2, LED3 are operated according to this configuration.

FIG. 2B shows an alternative embodiment according to FIG. 1 for operating the detector circuit according to the PWM interface standard. A power management IC PMIC, which generates pulse width modulated output data EN that is present at the second input node In2, is connected to the second input node In2. The first input node In1 is kept at a constant voltage EXT via an externally connected resistor Rset. This voltage is generated by the current source Idet, which is coupled between the terminal for a supply voltage Vbat and the first input node In1.

FIG. 3 shows an integrated circuit according to the proposed principle. In contrast to the detector circuit according to FIG. 1, the detector circuit additionally comprises a charge pump CP, which is connected between the terminal for a supply voltage Vbat and the load current source ILED. A second control module PWM for implementing the PWM interface standard is provided in addition to the first control module I2C. An output node Vout, at which an output voltage can be tapped, is also provided.

LIST OF REFERENCE NUMBERS

CP Charge pump
EN Data signal
Ext Constant voltage
GND Ground
Host Generator
I1 First load current source
I2 Second load current source
I2C First control module
Third load current source
Idet Current source
ILED Load current source
In1 First input node
In2 Second input node
LED1 First light-emitting diode
LED2 Second light-emitting diode
LED3 Third light-emitting diode
PMIC Power Management IC
PWM Second control module
R1 First resistor
R2 Second resistor
Rset Externally connected resistor
SCL Clock signal
SDA Data signal
Vbat Terminal for a supply voltage
Vdd Voltage source
Vout Output node

The invention claimed is:

1. Detector circuit comprising:
a terminal for a voltage supply,
a terminal for connecting a light source that is connected to the terminal for the voltage supply and to a first control module of a first interface protocol and a second control module of a second interface protocol,
a first input node and a second input node, the first control module being connected to the first input node and the second input node, and the second control module being connected to the second input node, and
a detector for defining an interface standard, which has one connection to the terminal for the voltage supply and the first input node, and a second connection to ground.

2. Detector circuit according to claim 1, in which the detector comprises a current source that is connected to the terminal for a voltage supply and the first input node.

3. Detector circuit according to claim 1, in which the detector comprises a comparator.

4. Detector circuit according to claim 1, in which the detector comprises a logic gate.

5. Detector circuit according to claim 1, in which the first control module is designed for operating the light source according to an I2C interface protocol and the second control module is designed for operating the light source according to a PWM interface protocol.

6. Detector circuit according to claim 1, in which an external resistor is connected to the first input node.

7. Detector circuit according to claim 6, in which the detector comprises a charge pump that is connected to the terminal for a voltage supply and to the load current source in order to drive the light source.

8. Detector circuit according to claim 1, that comprises at least one load current source connected to the first control module or the second control module in order to drive the light source.

9. Detector circuit according to claim 1, which is configured as an integrated circuit.

10. Method for operating a detector circuit comprising:
detection of a signal at a first input node of the detector circuit,
based on the detected signal, shifting the detector circuit into a first operating mode corresponding to a first interface protocol or shifting the detector circuit into a second operating mode corresponding to a second interface protocol, and
operating a light source according to the first interface protocol or according to the second interface protocol,
wherein in the detector circuit comprises a detector for defining an interface standard which has one connection to the terminal for the voltage supply and the first input node, and a second connection to ground.

11. Method for operating a detector circuit according to claim 10, wherein the signal is detected at the first input node by providing a current at the first input node and measuring a voltage across a resistor.

12. Method for operating a detector circuit according to claim 10, wherein the first operating mode is designed for operating the light source according to an I2C interface protocol and the second operating mode is designed for operating the light source according to a PWM interface protocol.

* * * * *